US008412736B1

(12) United States Patent
Arnold et al.

(10) Patent No.: US 8,412,736 B1
(45) Date of Patent: Apr. 2, 2013

(54) SYSTEM AND METHOD OF USING ACADEMIC ANALYTICS OF INSTITUTIONAL DATA TO IMPROVE STUDENT SUCCESS

(75) Inventors: Kimberly E. Arnold, Lafayette, IN (US); John P. Campbell, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 12/911,310

(22) Filed: Oct. 25, 2010

Related U.S. Application Data

(60) Provisional application No. 61/254,655, filed on Oct. 23, 2009.

(51) Int. Cl.
G06F 7/00 (2006.01)
G06F 17/30 (2006.01)
G06E 1/00 (2006.01)
G06E 3/00 (2006.01)
G06F 15/18 (2006.01)

(52) U.S. Cl. ........... 707/776; 707/603; 707/942; 706/21

(58) Field of Classification Search .................. 707/776, 707/942, 603; 706/20–21
See application file for complete search history.

(56) References Cited

U.S. PATENT DOCUMENTS

| 7,512,627 | B2* | 3/2009 | Hossfeld et al. .................. 1/1 |
| 7,908,231 | B2* | 3/2011 | Miller ............................ 706/16 |
| 7,912,900 | B1* | 3/2011 | Lippert et al. ................ 709/204 |
| 7,937,416 | B2* | 5/2011 | Hossfeld et al. ............... 707/803 |
| 8,065,250 | B2* | 11/2011 | Stephens ......................... 706/45 |
| 2002/0116253 | A1* | 8/2002 | Coyne et al. ..................... 705/10 |
| 2004/0110119 | A1* | 6/2004 | Riconda et al. ................ 434/350 |
| 2005/0282125 | A1* | 12/2005 | Christensen et al. ......... 434/219 |
| 2006/0166174 | A1* | 7/2006 | Rowe et al. .................... 434/236 |
| 2008/0138785 | A1* | 6/2008 | Pearson ......................... 434/353 |
| 2008/0208777 | A1* | 8/2008 | Stephens ......................... 706/12 |
| 2008/0228747 | A1* | 9/2008 | Thrall et al. ...................... 707/5 |
| 2008/0254431 | A1* | 10/2008 | Woolf et al. ................... 434/322 |
| 2009/0029339 | A1* | 1/2009 | Botha et al. .................... 434/433 |
| 2009/0037236 | A1* | 2/2009 | Miller et al. ...................... 705/7 |
| 2009/0202969 | A1* | 8/2009 | Beauchamp et al. ......... 434/335 |
| 2010/0009330 | A1* | 1/2010 | Yaskin ........................... 434/350 |
| 2010/0009331 | A1* | 1/2010 | Yaskin et al. .................. 434/362 |
| 2010/0009332 | A1* | 1/2010 | Yaskin et al. .................. 434/362 |
| 2010/0062411 | A1* | 3/2010 | Bartholomew ............... 434/350 |
| 2010/0190142 | A1* | 7/2010 | Gal et al. ....................... 434/322 |
| 2010/0261150 | A1* | 10/2010 | Matwick ....................... 434/350 |
| 2011/0065082 | A1* | 3/2011 | Gal et al. ....................... 434/365 |

OTHER PUBLICATIONS

Steven Tally, Signals tells students how they're doing even before the test, Sep. 1, 2009.*

* cited by examiner

*Primary Examiner* — Jeffrey A Burke

(74) *Attorney, Agent, or Firm* — Maginot, Moore & Beck, LLP

(57) ABSTRACT

Systems and methods that extend the use of data mining to identify students academically at risk of performing poorly or withdrawing from school altogether. In doing so, academically at-risk students are identified early and guided to resources to improve their academic performance.

22 Claims, 6 Drawing Sheets

SYSTEM AND METHOD OF USING ACADEMIC ANALYTICS OF INSTITUTIONAL DATA TO IMPROVE STUDENT SUCCESS

CROSS-REFERENCE TO RELATED APPLICATION

This application claims the benefit of and incorporates by reference the contents of U.S. Provisional Patent Application No. 61/254,655, filed Oct. 23, 2009, along with all material incorporated by reference into said provisional patent application and all references cited therein.

INCORPORATION BY REFERENCE OF MATERIAL SUBMITTED ON A COMPACT DISC

Pursuant to 37 C.F.R. §1.52(e) and 37 C.F.R. §1.96(c), this application incorporates by reference a computer program listing on a compact disc, submitted herewith in duplicate. A list of the files contained on the disc is set forth in the accompanying Appendix A.

BACKGROUND OF THE INVENTION

This invention relates to academic analytics, and more particularly to the use of academic analytics to improve student success.

Across the country, institutions of higher education are struggling with problems relating to retention of early career students. The rising cost of tuition, a higher calling for accountability, and the lack of institutional attention to first-year student experiences combine to make retention a devastating factor on the effectiveness of the education being delivered today. The ability to predict student academic performance and retention within higher education has long been a focus of faculty and institutional research. The results of this research have led to the development of admissions formulas, descriptive models, assessment tools, and numerous journal articles.

Accurately predicting academic success and ensuring retention of students has been examined from a number of different directions. One of the earliest applications for predicting academic success was the college admissions process. As the demand for higher education grew, institutions turned to various mathematical models based on high school records and standardized examinations. However, such attempts failed to address the issue of retaining students once they were accepted into an academic institution.

One of the first attempts to explain student retention was made in 1975 by Alexander Astin, who created the Input-Environment-Outcome model to serve as a conceptual framework for analyzing student persistence in studying. The purpose of the model was to assess the impact of various environmental experiences by determining whether students grow or change differently under varying environmental conditions. Astin argued that one must examine the preexisting characteristics prior to entering college (inputs), the environmental factors of the institution (size, student involvement, etc.), and the effects of college (outcomes). In 1991, Astin identified 146 possible input (pre-college) variables including: age, race, high school grades, and reasons for attending college. Astin also identified 192 environmental variables which might influence student success. These were broken into eight classifications: institutional characteristics, students' peer group characteristics, faculty characteristics, curriculum, financial aid, major field of choice, place of residence, and student involvement. The final component of Astin's model was outcomes. Astin identified 82 outcomes including academic cognition, career development, and retention.

Vincent Tinto, another notable researcher in this field since the mid-1970s, also attempted to explain the variables that influence student persistence. Tinto theorized that students enter with a certain set of characteristics that increase or decrease their commitment to and integration into the institution and concluded that greater integration leads to higher retention. In a speech given to the European Access Network in 2002, Vincent Tinto noted that "students are more likely to persist when they find themselves in settings that hold high expectations for their learning, provide needed academic and social support, and actively involve them with other students and faculty in learning." As researchers have struggled to understand the factors that ensure student retention, the students themselves have changed in ways that undermine the effectiveness of previous research and proposed solutions.

When interacting with a generation that prefers an on-line conversation to a real-life one, there exist challenges with letting students know how they are doing in a class before it is too late for them to change behaviors, especially when failing to change behaviors would result in receiving a D, F, or withdrawal (D/F/W) from the course—final outcomes that generally will not help students persist towards their stated degree objectives. It would seem that this can be easily addressed simply by students taking the time to either meet with their professors on a regular basis or by simply keeping track of the grades they receive and then seeking assistance when needed. Indeed, previous research would suggest this approach. However, students generally are not proactive enough for these behaviors to occur. Despite nearly six decades of research studying the issues of student persistence and retention in higher education, overall retention figures have remained between 45% and 50%. It is clear that major deficiencies exist in the prior art systems, methods, and proposals and the problems are frustrated by the fact that students themselves have changed, as discussed above.

SUMMARY OF THE INVENTION

The present invention includes systems and methods that extend the use of data mining of course management data to identify students academically at risk of performing poorly or withdrawing from school altogether. In doing so, academically at-risk students are identified early and guided to the resources already available on campus. Throughout this application, it should be understood that reference to "a student" is not meant to be limiting and can equally apply to multiple students. Further, references to "he" should be interpreted to mean "he or she."

Certain embodiments of systems according to the present invention include a network of computers containing memory and processor-executable instructions for collecting, storing, and retrieving data relating to one or more students at an academic institution, analyzing the data and determining the level of risk associated with the student. In preferred embodiments, three categories of risk are used: high risk, moderate risk, and low risk. Data elements that may be collected by an exemplary system of the present invention include demographic data, extracurricular activity data, transcript data, personal data, financial information, admissions data, academic data, registration data, course information data, and instances of help-seeking behavior by a student. Preferably, the system continuously re-evaluates the risk associated with each student based on additional data collected by system throughout the duration of a course, semester, year, degree, or other time frame. Certain embodiments of the system include one or more computers for collecting said data, a database for storing and retrieving the information, at least one computer which analyzes the data and determines the risk group associated with each student, and one or more computers for communicating risk-related information to a person, such as a faculty member who may take a corresponding action, for example by offering tutoring to a student, reminding the student of existing help resources, or congratulating the student on his achievement. Additionally or alternatively, certain embodiments of systems according to the present invention may directly notify a student of what risk category he falls into and offer advice on how to reduce the risk. This act of notifying a student of his risk category is referred to herein as an "intervention."

Certain embodiments of systems in accordance with the present invention may communicate risk status to people through, for example, a web page showing a visual indication a student's risk category, email, a text message sent to a mobile phone, or a pre-recorded voice message sent to a phone. Accordingly, embodiments of the system may include a web server, computer-executable instructions for sending messages via email, such as through the Simple Mail Transfer Protocol ("SMTP"), an interface to a local area network, a wide area network, or a global network, such as the Internet. Additionally, embodiments of systems according to the present invention may include one or more interfaces to one or more wired and/or wireless phone networks.

Certain methods according to the present invention are, for all practical purposes, carried out substantially by computer, including collecting, storing, and retrieving data relating to one or more students at an academic institution, analyzing the data and categorizing each student into a risk category, and communicating to a person an indication of or message relating to the risk category associated with the student. The visual indication or message associated with a student's risk category may be communicated to more than one person and may be communicated upon request from a person, or upon the happening of an event, such as when a new piece of data is collected or when the student's risk category changes, or at a predetermined time.

In addition, certain systems and methods according to the present invention provide a student with access to his current standing as well as those of his peers, in aggregate to protect privacy, in each course. Additionally, in certain embodiments, the risk category of a student is determined for each course the student is enrolled in. Further embodiments provide a student with information relating to his past performance and present him with scientifically derived learning profiles suggesting how the student may take ownership of his learning based on what helped, or did not help previous students with similar learning styles and other characteristics. Certain embodiments allow a student to use a predicative algorithm to inform him of action that needs to be taken to either maintain or improve his performance in a class. Also, certain embodiments allow a student to look at his current and predicted risk category at multiple levels: such as course level, college/department level, and college/university level.

Certain embodiments of the inventive systems and methods provide a visual user-interface, for example a web page, referred to herein as a "student dashboard" or just "dashboard." The student dashboard includes "matrix data" which provides a way for a student to track his progress across a course. There are many options for a student here. A student can see his progress plotted from intervention to intervention along with that of his peers. Further, a student can filter data showing him if his performance went up, down, or stayed the same, based on student-selected parameters, for example from before an exam to after an exam. The matrix data can also be filtered on data type: including performance (percentage to date) and effort. This feature is also very useful to faculty. For example, perhaps a member of the faculty is examining the matrix data of all the students in her course and she sees that for a particular intervention, perhaps right after an exam, 40% of the students in her class drop from no or moderate risk to high risk of failure. Then, by triangulating the data from various technologies effort, and viewing help seeking behavior, the instructor may notice that the content on the exam was not properly representative. This is a way for a faculty member to know she needs to reiterate a subject in the next lecture or correct the exam score by applying a curve and then addressing the exam and syllabus before the next semester begins. In this way the certain systems and methods of the present invention can serve as a diagnostic tool for instructors and program heads, as well as a form of formative assessment for curriculum.

Systems and methods according to the present invention preferably implement algorithms for categorizing students into varying risk categories based on variables specific to each university, college/school, and course. In practice this means that many algorithms are in place, each customized with different variables and weightings according to the situation. In certain embodiments, a graphical user interface is provided for customizing an algorithm. The analysis implemented in systems and methods according to the invention is not based on flags placed by humans but by regression models at several levels. Risk status comes from more than the simple calculation of reported "static" features such as ethnicity or gender. Instead, predictive science is applied, meaning student risk categorization algorithms are derived from predictive analyses which results in better accuracy than the prior art methods and systems and allow the systems and methods of the present invention to suggest data-derived interventions.

Embodiments of the present invention include methods and systems that allow for tracking student attendance in classes. Additionally, student success algorithms can be customized to take into account the ratio of instructors to students, which is a huge component of student success. For example, while one instructor may give all large lectures, there may be ten different teaching assistants ("TAs") proctoring labs. In this case, an algorithm could be personalized for both the entire course and the lab sections for comparison by faculty or students.

Systems and methods of the present invention preferably employ a student success algorithm which is calculated on variables specific to each a) university b) college/school and c) course. In practice this means that many algorithms are in place, each customized to the situation. Accordingly, risk categorization comes from more than the simple calculation of reported features, such as ethnicity or gender. Instead each algorithm is derived from predictive analyses which is a) more accurate than prior art systems and methods and b) allows systems and methods according to the present invention to suggest various data-derived interventions to instructors for students. Each algorithm may comprise different variables and weightings. In addition, preferable systems and methods of the present invention safeguard against profiling of federally or institutionally protected classes of students. In systems and methods of the present invention, students are not "at risk" simply because of demographic information. Further, certain systems and methods according to the present invention will not associate a risk categorizations to students unless there are sources of data selected outside of the demographic fields.

Certain systems and methods according to the present invention take into account past interventions and student characteristics and propose to instructors interventions that have been most successful in the past. While ideally the instructor or advisor would rely on the accuracy of the science behind the recommendation, the interventions may be overridden at the instructor's whim.

In some embodiments of the present invention, views, dependent upon role, for progress at many levels will be displayed. For example, a student can look at progress and risk categorization information with respect to a single course, across a semester of course, or across the student's career. Visual representation is visible to students, instructors, program heads, advisors, and other people with proper authorization, all in compliance with the Family Educational Rights and Privacy Act ("FERPA") and other privacy considerations.

In short, various embodiments of the inventive systems and methods provide the following advantages over the prior art:
1. It is both performance (grade) and behaviorally (interaction with technology, help seeking behavior etc.) based;
2. It does not necessarily bias prediction on "demographic" data—for example, a student is not automatically labeled 'at risk' just because they are low income;
3. Instructors are able to provide real-time feedback to students;
4. Intervention starts early in the semester—as soon as the second week of class, depending on structure of the course;
5. It allows instructors to provide frequent and ongoing feedback;
6. Visual representation of student progress is available (stoplight and graphical representation;
7. A relative peer component is incorporated;
8. Both static and dynamic data is employed; and
9. Detailed student and faculty dashboards are available to view progress across courses.

DETAILED DESCRIPTION OF PREFERRED EMBODIMENTS

Figure 1:
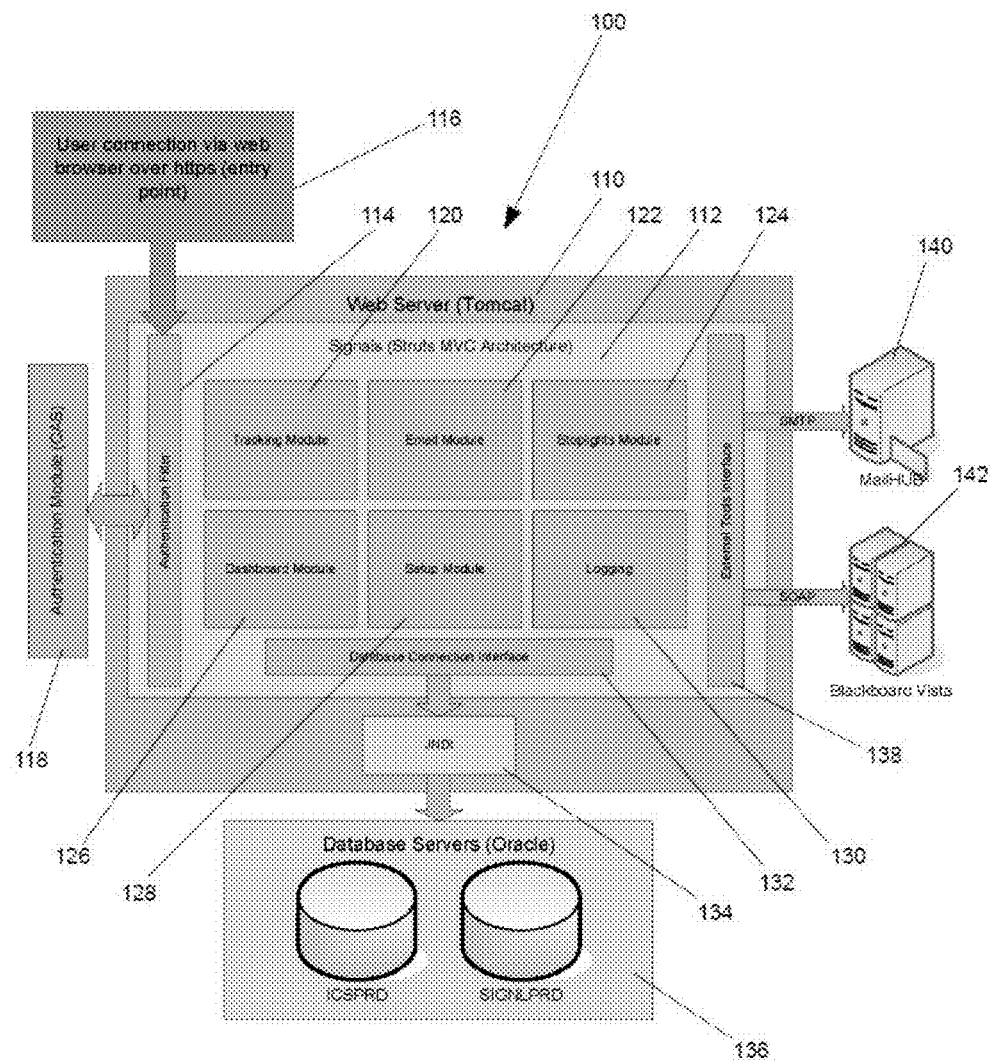
FIG. 1 is a system architecture overview according to an illustrative embodiment of the present invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments and such further applications of the principles of the invention as illustrated therein being contemplated as would normally occur to one skilled in the art to which the invention relates.

FIG. 1 is a system architecture overview according to an illustrative embodiment of the present invention. The system 100 includes a web server 110 capable of running a Java Servlet, an application that extends the functionality of a web server. The web server 110 in this embodiment is a computer configured with Tomcat, an open source servlet container developed by the Apache Software Foundation, which implements the Java Servlet and the JavaServer Pages ("JSP") specifications from Sun Microsystems. The servlet 112 supported by the web server 110 is implemented in the open-source web application framework, Apache Struts, a framework which supports a software architecture known in the art as model-view-controller ("MVC"). Within the servlet 112 are various filters, modules, and interfaces. The servlet 112 contains an authentication filter 114, which receives connection requests 116 from web browsers of computers attempting to connect to the web server 110 and passes login and password, or other authentication information from the connection requests to an external authentication module 118.

The authentication module 118 determines whether the connection request is from a person or computer with proper authentication information and informs the servlet 112 whether to accept the connection or not. The servlet 112 contains a tracking module 120 which carries out computer-executable instructions for collecting data pertaining to a student and assigning a risk category to the student based on said data. The email module 122 carries out computer-executable instructions for sending an email to a faculty member, student, or other party concerning the risk category assigned to the student. The stoplights module 124 generates a visual indicator of a student's risk category, in the form of a graphic of a traffic stoplight having green, yellow, and red lights. The green light is illuminated if the student's risk category is low. If the risk category is moderate, the yellow light is illuminated. If the risk category is high, the red light is illuminated. The stoplight graphic is presented on a web page, preferably in a conspicuous area where it is likely to be noticed. Further, consistent with the scope of the present invention, the stoplight may be shown in connection with a risk category assigned to the student's performance with respect to a certain course, or at a different level of generality, such as the student's overall academic performance in all courses over a given time frame. The dashboard module 126 provides an interface for a student, faculty member, or other person viewing information about a student's performance to specify parameters on which academic performance and risk categorization information should be focused. The setup module 128 allows a person to specify settings affecting the overall operation of the servlet 112, including how it interoperates with external modules and servers. The logging module 130 performs the function of logging requests for information, interactions with the dashboard module, and other activities taken by users of the servlet 112.

The database connection interface 132 allows the servlet 112 to communicate through a Java Naming and Directory Interface 134, with one or more computers containing a database ("database servers") 136. Importantly, the tracking module 120 relies on the database servers 136 to store data and retrieve data according to instructions issued by the tracking 120 through the database connection interface 132. Preferably, the database is relational and supports requests in the Structured Query Language ("SQL"). In this illustrative embodiment, the database is an Oracle database. The external tools interface 138 allows the modules, 120 through 130, to communicate with computers and systems external to the web server 112. For example, the email module 122 communicates with a mail server 140 via the external tools interface. Communication to the mail server 140 takes place in the Simple Mail Transport Protocol ("SMTP"). Similarly, the tracking module 120 may communicate with a course management system ("CMS") 142, which in this case is Blackboard Vista, to collect data about a student's activities on the CMS 142. Also, the stoplights module 124 may communicate with the CMS to transfer information for presenting a graphical stoplight indicator, as explained above, within the CMS. Communication between the servlet 112 and the CMS takes place through the Simple Object Access Protocol ("SOAP").

Figure 2A:
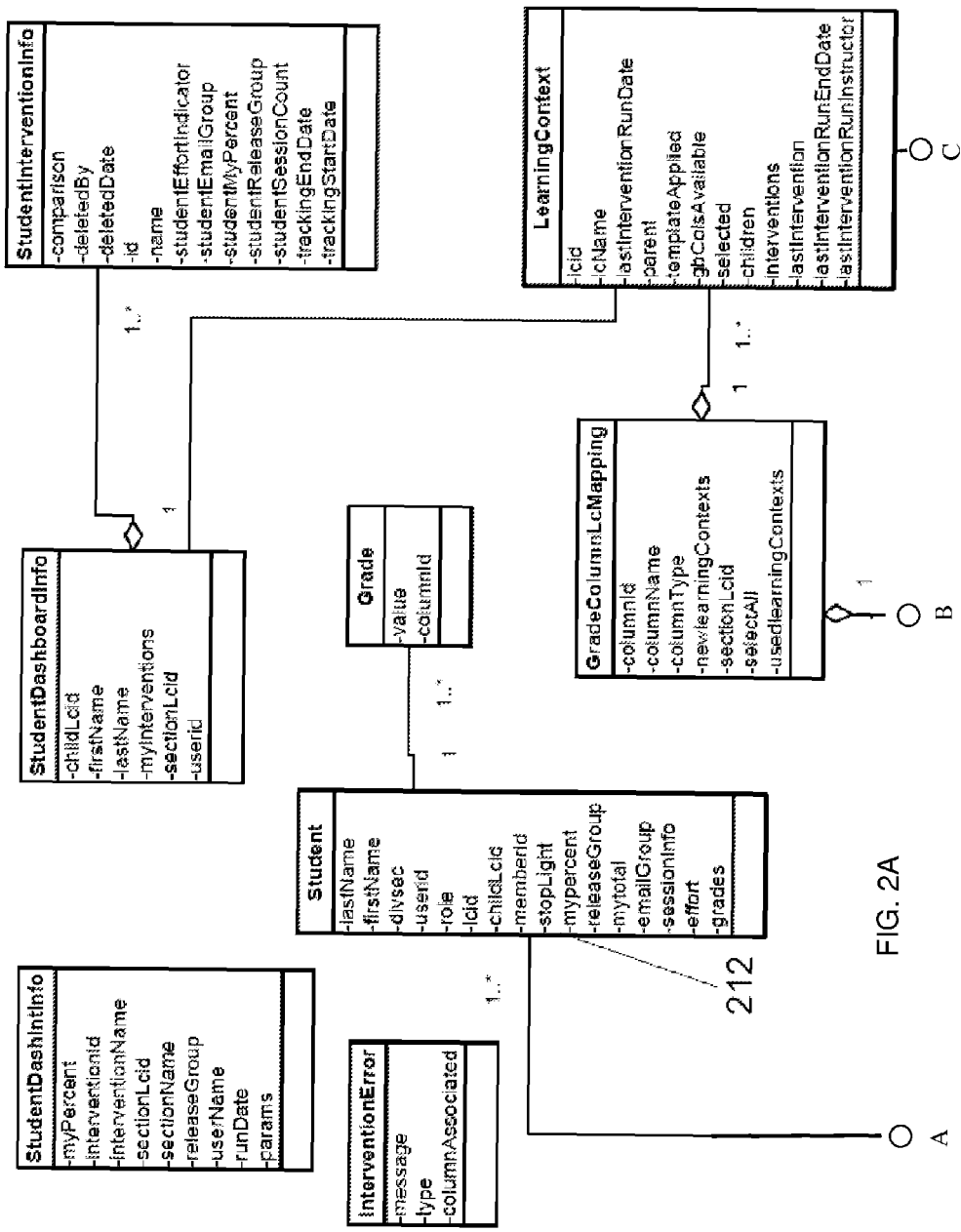
FIG. 2 is a diagram of database tables and fields used in an illustrative embodiment of the present invention.
Figure 2B:
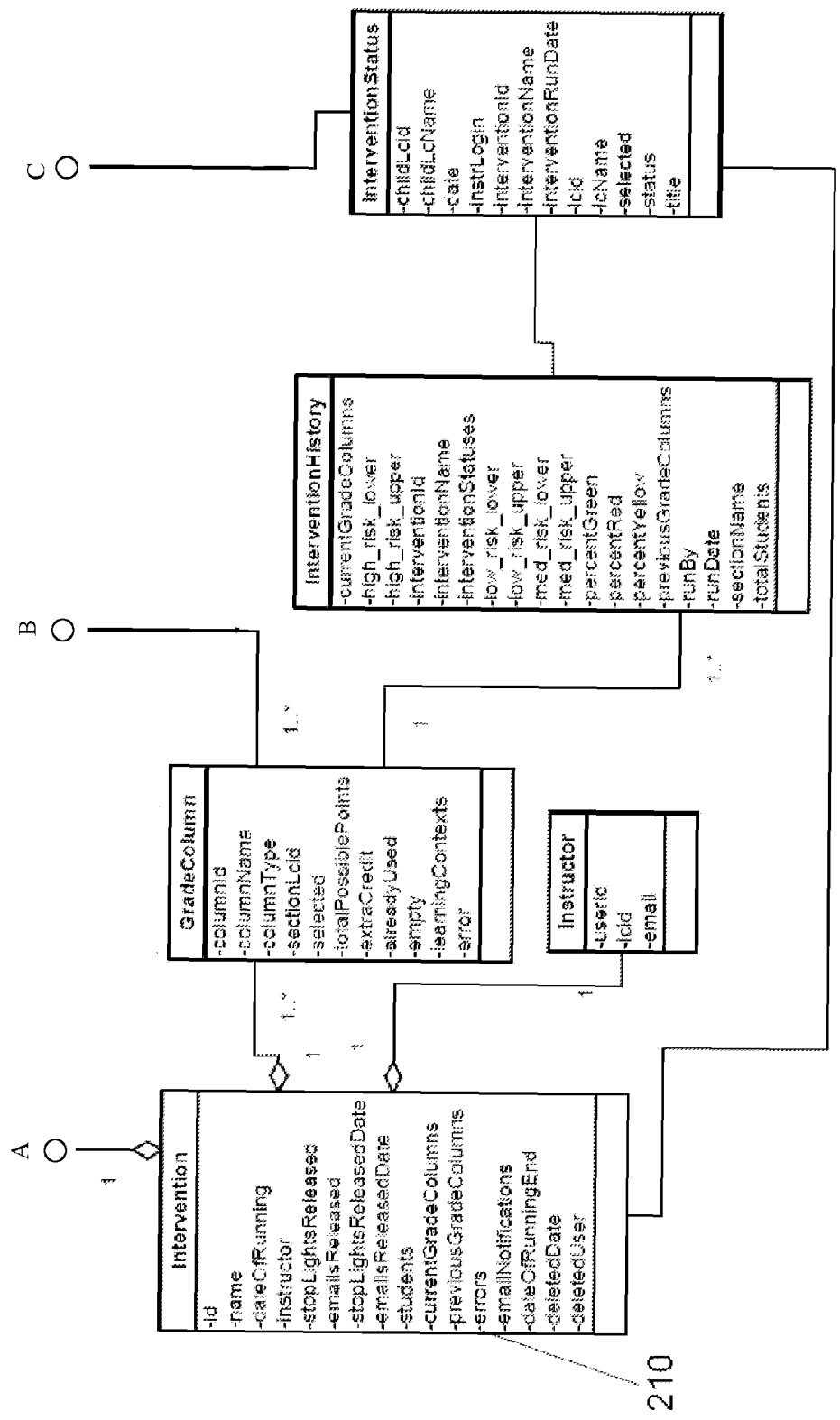
Figure 2C:
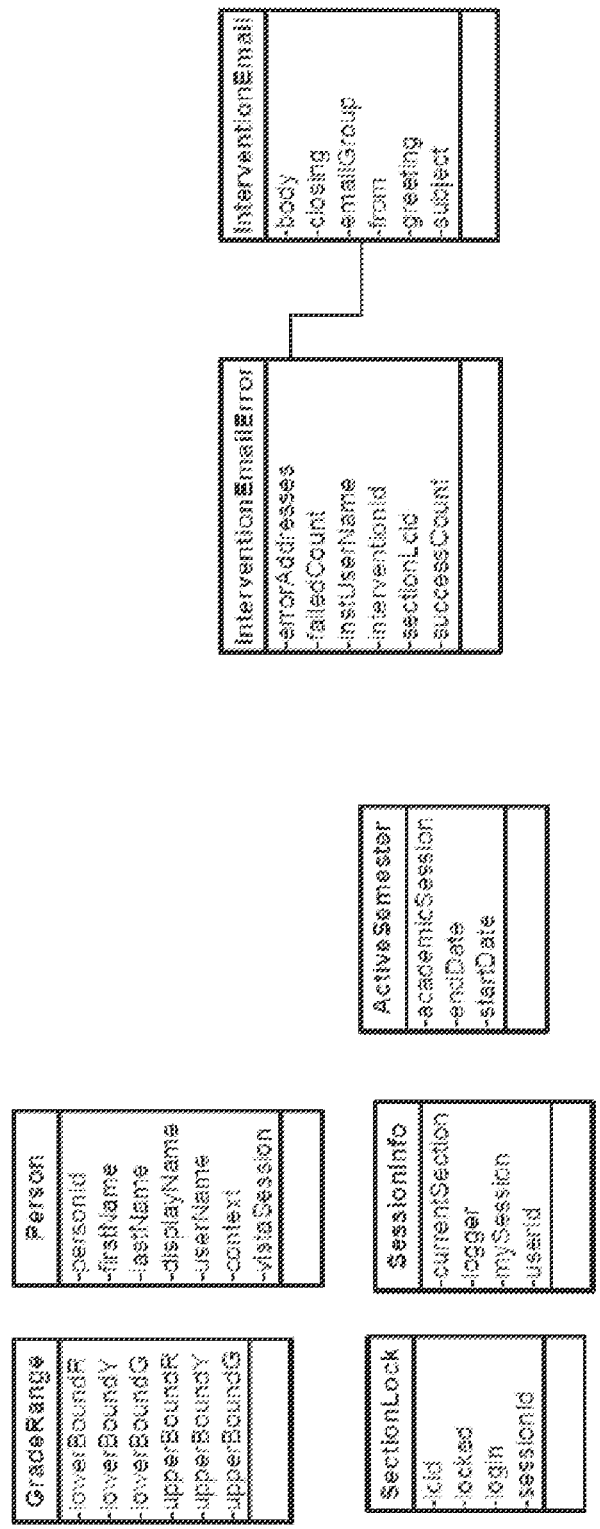

FIG. 2 is a diagram of database tables and fields used in an illustrative embodiment of the present invention. With reference to FIG. 1, the database tables and fields are stored in database servers 136 and accessed by servlet 112 running on the web server 110. In embodiments implemented in Java 2 Enterprise Edition ("J2EE"), an instance of an entity embodying the information in a table is an instance of a "bean" and each bean has "attributes" corresponding to the fields in the table. In preferred embodiments, certain beans may have a one-to-many or zero-to-many relationship with certain other beans. In the embodiments corresponding to FIG. 2, this is indicated, for example, in the line from the "Intervention" table 210 to the "Student" table 212. A "1" appears near the "Intervention" table 210 in the diagram. Near the "Student" table 212, "1.*" appears next to the line. This notation represents that each unique Student bean can be associated with exactly one unique Intervention bean (hence the "1") but one unique Intervention bean can be associated with 1 to N (hence the "1.*") unique Student beans. Uniqueness in this context refers to the absence of any other bean having the same attributes associated with it. Other embodiments may use different relationships between beans. Further, other embodiments may be implemented in a language and platform other than Java while retaining the foregoing relationships between entities embodying information in the database tables of FIG. 2. Table 1 below contains a non-exhaustive set of types of data that can be collected, stored, and analyzed by the system 100 to assign a risk category to a student.

TABLE 1

| Data Type | Data |
| --- | --- |
| Demographic Data | Race, Gender, Marital Status, Age, Status (FT/PT), University standing, College, Department, Major, Minor, Area of concentration, Academic year |
| Personal Data | Legal name, Nickname, Local address, Country, Personal ID number, SSN, Home address, Birth date, Nationality, Citizenship type, Email, Military status, Native language, Visa, Disability, Sponsor, Spouse accompanying, Religion, First generation student, Residency, Leave, Role, Medical information, Family Information |
| Extra Curricular Activity Data | Sport membership, Organizational membership, Outside interest, Greek membership |
| Financial Information | Remised fees, Financial aid awarded, Dependent status, Scholarships, Need analysis, Applicant need, Adjusted gross income, Parental gross income, Parent contribution, Employer contribution, State aid awarded, Federal aid awarded, Inst award granted, Work study applied, Loan application, Promissory notes, Payment schedule, Transaction history |
| Housing Data | University housing, On/off campus, Hall assignment, Room assignment, Room capacity, Temporary housing, Learning community, Phone number, Meal plan |
| Employment Data | Employed by University, Resume, Employment history |
| Transcript Data | College GPA: course, College GPA: semester, College GPA: Cumulative, Number of semesters |
| Admission Data | ACT composite, SAT composite, SAT: verbal, SAT: math, High school, High school rank, High school GPA, GRE, High school honors, Admission essay, Statement of purpose, Education level (history), Employment history, Financial aid status, Recruitment information, Admission interview, Mean family income, Applied before, Requirements waived, Decision (full, conditional) |
| Academic Data | Grades, Dean's list, Probation, Withdraws/drops, Transfer out, Transfer in Degrees awarded, Academic honors |
| Registration Data | Enrolled, Hours enrolled, Course information, Advisor, Faculty sponsor, Cohort membership, Continuing education |
| CMS Data | Assessment: time, Assessment: open, Assessment: completed, Assignment: time, Assignment: open, Assignment: completed, Calendar entries: created, Calendar entries: read, Chat and whiteboard sessions, Content files read, Discussion postings: created, Discussion postings: read, Email messages: created, Email messages: read, Email messages: received, Media library entries viewed, Organizer pages viewed, Sessions, Total time URLs viewed |
| Course Information | School, Department, Survey level, For majors, Level, Time, Enrollment, Instructor, Teaching Assistants |
| Help Resources Data | Help center visited, Tutor: university, Tutor: private, Walk-in help, Course help sought for, Number of session, Online tutorials, Help sessions attended |
| Technical Log Data | ePortfolios, Clickers, Plagiarism detection, Lab activity, Printing activity, Internet usage, ITunes/podcasts, Desktop conferencing, Email |
| Survey Data | Expectation data, Satisfaction data, Engagement data, Course evaluations, Instructor evaluations |
| Other Data | Attendance, Tardy, Unexcused absences, Workshops attended, Training, Retention data, Library data |

As explained previously, the exact set of data that a particular embodiment of a system according to the invention tracks and analyzes can be customized to match the specific needs of a university, college/school, or course that the system is used with. Further, a weight can be assigned to each type of data, to reflect the fact that certain types of data are more important than others in predicting student success. As will be appreciated, certain types of data are "static" meaning that, for a given student, they are only recorded once and do not change. For example, items categorized as Admission Data in Table 1 are considered static. By contrast, other types of data are "dynamic" in that they are constantly changing or being added to. For example, the data categorized in Table 1 as CMS Data is dynamic. It includes the number of postings that a student has read and/or created in a class-related discussion, when assignments are opened and/or completed, and various other indications of a student's activity within the course management system on an ongoing basis. In their preferred embodiments, the systems and methods according to the present invention continuously collect and analyze dynamic data, ensuring that risk categorizations reflect the most up-to-date information available for any given student.

Figure 3:
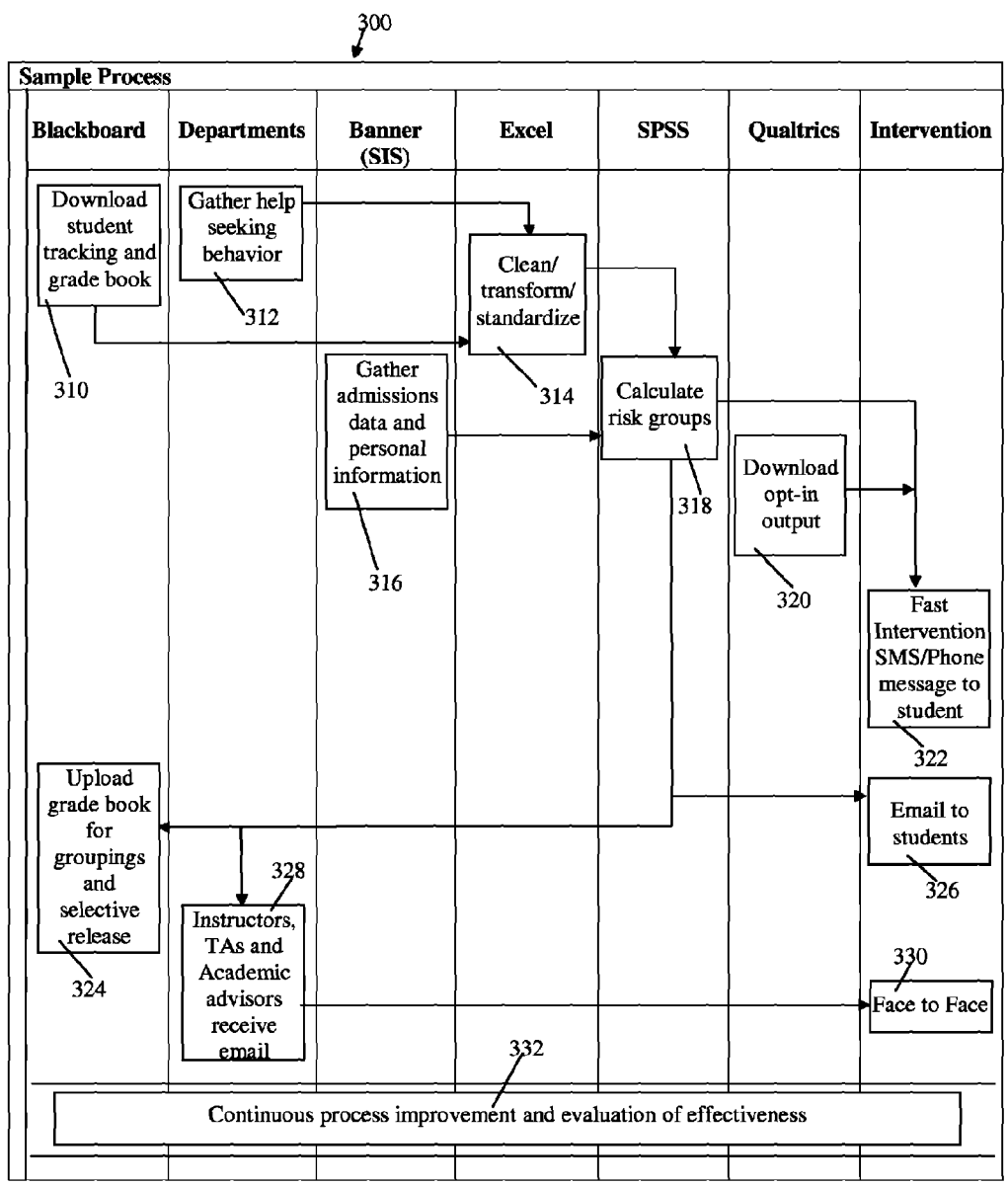
FIG. 3 is a flowchart of a method according to the present invention for collecting information, analyzing the information and assigning a risk category to a student, and initiating an intervention.

FIG. 3 is a flowchart of a method 300 according to the present invention for collecting information, analyzing the information and assigning a risk category to a student, and initiating an intervention. Generally, the process of collecting information from various sources begins on the left of the flowchart. Advancing to the right, the information is analyzed and risk categories (also called "groups") are assigned to students, and finally, one or more interventions occur. Starting at step 310, an information collecting step, student tracking and grade book information is downloaded by an embodiment of a system according to the present invention. At step 312, the system collects information pertaining to help-seeking behavior of a student or students. Table 1 contains the data type "Help Resources Data" which includes instances of when a student visited a help center, sought help from a tutor, took an online tutorial, and other help-seeking behavior. The data collected in steps 310 and 312 may include human-entered information which may not follow a standardized format. At step 314, the system cleans, transforms, and standardizes the data from steps 310 and 312 for further processing. At step 316, the system collects admissions data and personal information relating to a student. Table 1 above gives further information on the specific data that falls under "Personal Data" or "Admission Data."

At step 318, the system analyzes the collected data and assigns a risk category to a student. At this point, the risk category information is ready to be distributed via multiple channels. At step 320, the system determines whether a user of the system, specifically a student in this case, has indicated at a previous time that he will accept text (SMS) messages and/or voice messages to his phone. If so, the system sends a pre-stored text message or voice message to the student. The message sent to the student is based on the risk category that the student falls into. Accordingly, during an earlier setup phase, messages are defined or pre-scripted for each risk category, and in preferred embodiments, also for the week or percentage completion of the semester or course. That is, a pre-scripted message sent to a high-risk student in the final weeks of a semester will have a more urgent message to seek assistance than would a message to a high-risk student during the beginning weeks of the semester. This is advantageous because opportunities for a student to seek help, earn points, and/or generally improve his overall grade or academic performance diminish as time remaining in the course or semester decreases. As an alternative or additional action taken by the system after step 318, at step 324, the grade book is uploaded for groupings and selective release.

At step 326, which may be taken in addition to or in place of steps 320 and 322, the system send an email to the student regarding his risk category. Like the text and voice messages discussed above, the content of the email is also pre-set and varies depending on the risk category and the week or percentage completion of the semester or course. At step 328, the system sends an email regarding a student's risk category to other interested parties, such as instructors, teaching assistants ("TAs") and academic advisors. At step 330, based on the email of step 328, one or more of the interested parties conducts a face to face meeting with the student to help correct his behavior and increase his academic performance. As explained previously, the types of data tracked and the weights assigned to them, is customizable. Accordingly, as shown in step 332, the disclosed system is continuously undergoing a process of improvement and evaluation of effectiveness.

Figure 4:
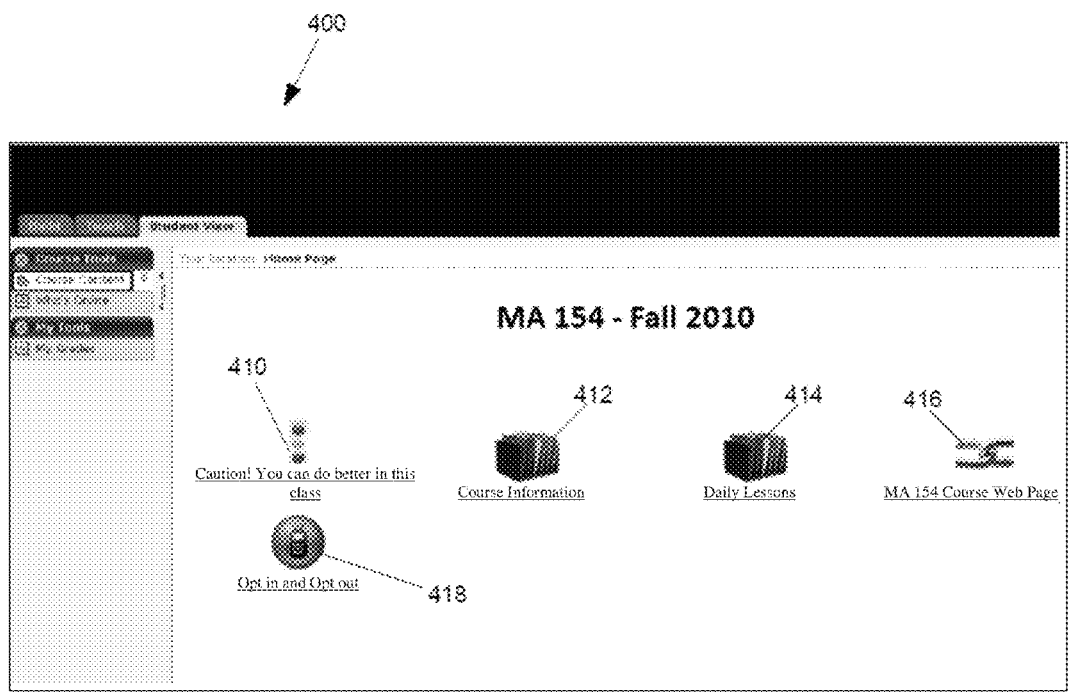
FIG. 4 is a user interface in an illustrative embodiment of the present invention.

FIG. 4 is a user interface 400 in an illustrative embodiment of the present invention. This interface is generated for presentation to a student by the servlet 112 operating on web server 110. The interface may be viewed directly by a student directing a web browser to a Uniform Resource Locator ("URL") associated with the web server 110 or all or a portion of it may be integrated into an interface presented by an external content management system 142. Again, in the latter case, communication between the servlet 112 and the content management system 142 takes place via the Simple Object Access Protocol ("SOAP") or another protocol for transmitting data. A graphic of traffic light 410 appears on the interface 400 with the yellow light illuminated and an associated message stating "Caution! You can do better in this class." This means that the system has assigned a moderate risk of poor academic performance to this student. If the risk category for the student was low, the green light would be illuminated and a message congratulating the student and/or encouraging the student to continue his study habits would be presented. Likewise, if the risk category was high, the red light would be illuminated and a message informing the student to seek help with the class would appear. Other embodiments might contain different messages depending on the risk category and how far along the student is into the course or semester. Also visible on the interface is a link 412 to course information, a link 414 to a set of daily lessons for the course, a link 416 to an external web page for the course, and a link 418 to allow the student to opt in or opt out of receiving voice and/or text messages to his phone. Appendix B includes a pre-scripted email to be sent to a student informing the student of the ability to opt in or out of receiving such communications, according to a preferable embodiment of a system or method of the present invention. Additionally, Appendix B includes sample text (SMS) and phone messages that may be sent to a student in accordance with a preferred embodiment of a system or method according to the present invention.

Certain embodiments of the present invention include a graphical user interface that presents a student, faculty member, or other authorized person with information on how one student's academic performance or risk categorization information compares to that of other students. Where the person viewing such information is a student, the information relating to the performance of other students is shown as a cumulative average which does not identify any of the other students. Certain embodiments of the present invention analyze and present to an authorized person risk categorization information pertaining to one or more students not only on a course by course basis, but also on varying other bases, including overall performance for a semester, year, or other time frame, and/or in relation to one or more specific schools or colleges within a university.

Certain embodiments of the present invention provide information to a student relating to his past performance. Further embodiments analyze the past performance data to arrive at a conclusion as to the student's learning style. Factors that determine the learning style of a student include, for example, instances of the student seeking tutoring from an instructor, a teaching assistant, or a tutoring center, time spent on the course management system, time spent reading or posting to one or more discussion boards relating to a class, the number of blog or wiki entries the student has generated in relation to a course, time spent reviewing course materials on the content management system, and time spent reviewing a course website. An improvement in academic performance following any one or more of such activities is indicative of the student's learning style. These embodiments then present the student with a statement of his learning profile and suggest strategies for improving the student's academic performance. The strategies are based on performance data from other students with the same or similar learning style who either maintained a high level of academic performance or who increased their academic performance after taking a certain action. These embodiments include a predictive algorithm for estimating what a student's future risk category will be based on his current risk category, and/or past performance data, and/or learning style. The estimations are calculated and presented on a course by course, college/department, and/or college/university level.

Some embodiments of the inventive systems and methods provide "matrix data" on the graphical user interface presented to a student, faculty member, or other authorized person. Matrix data provides a way for a person to track the progress of a student across a course. For example, a person may see a student's progress plotted from intervention to intervention along with that of the student's peers. A person may also filter data to view whether a student's performance increased, decreased, or did not change, over any time period or between two events. For example, a person may choose to view whether and how a student's performance changed from one exam to another. The matrix data can also be filtered on data type: including performance (percentage to date) and effort. It should be emphasized that this information is important not only to a student, but to faculty as well. For example, perhaps a member of the faculty is examining the matrix data of all the students in her course and she sees that for a particular intervention, perhaps right after an exam, 40% of the students in her class drop from no or moderate risk to high risk of poor academic performance. The faculty member may focus on data from various indications of student efforts, such as through time spent on the CMS system and/or help seeking behavior, such as visiting a tutoring center. With this information, the faculty member may conclude that the content on the exam was not properly representative. This is a way for a faculty member to know she needs to reiterate a subject in the next lecture or correct the exam score by applying a curve and then addressing the exam and syllabus before the next semester begins. In this way, the systems and methods serve as a diagnostic tool for instructors and program heads, as well as a form of formative assessment for curriculum.

Information collected by embodiments of the present invention may come from disparate sources and, as a result, not follow a uniform format. For example, a student's visit to a tutoring center may be initially recorded as his handwritten name, time in and time out of the center, and the course that the student sought help with, all recorded on paper. A particular instructor may use an Excel spreadsheet, or personal grade book program, rather than a University-wide learning management system ("LMS") that directly feeds grade information into database servers in accordance with the invention. Other sources of information include e-portfolio contributions, audience response systems, blogs, wikis, visits to the instructor during office hours, study sessions, and role-based behavioral activity entries. For role-based behavioral activity entries, a student might record in free form text or in a prescribed format that he reviewed notes for an hour, listened to a podcast, and read three chapters of course materials. The system preferably has a modular architecture that allows for the installation of plugins which convert data, using for example, file format converters and/or optical character recognition ("OCR"), from each of these various sources into a format which is better suited for transmission to the database servers.

Tables 2.1 through 2.3 set out an illustrative set of criteria for determining a student's risk category and actions ("interventions") to be taken in accordance with each risk category. The criteria changes on a weekly basis, for the most part. The intervention schedule includes a variety of ways for communicating the risk status of the student. The emails associated with the interventions are pre-scripted and grow in urgency as the semester goes on because lost opportunities to score points on tests and other evaluations make it more difficult for a student to "pull himself up." The interventions start at week 1 and continue for the following 8 weeks of the course. Lab grades begin on week 1.

Table 2.1 includes the criteria for defining high, moderate, and low risk of poor academic performance and the associated interventions for the first three weeks of a course. As can be seen, each week includes displaying a traffic signal as disclosed with reference to item 410 in FIG. 4 and the stoplights module 124 in FIG. 1. The light shown on the traffic signal is red if the criteria for high risk are met. A yellow traffic light is shown if the criteria for moderate risk are met. Finally, a green traffic light is shown if criteria for low risk are met. Additionally, the high and moderate risk categories for weeks 1 through 3 each have an email message associated with them. The email message is pre-scripted and includes one or more fields to be populated when the email is actually sent. Examples of suitable email messages referred to in Tables 2.1 through 2.3 are included in Appendix B. For example, in one embodiment, the student's name is inserted into the email message by the system when it is sent. Physical face-to-face interventions are within the scope of the inventive systems and methods. The high-risk category for week 3 includes not only the red light and an email message, but also a request for a meeting between the instructor and the student. The request may be sent by the system to the student by email and in other embodiments the system may notify the instructor to request an interview with the student.

TABLE 2.1

|  | High | Moderate | Low |
|---|---|---|---|
|  | Week 1 | | |
| Criteria | n/a | n/a | n/a |
| Intervention | Red traffic signal<br>Email message 1.0 | Yellow traffic signal<br>Email message 1.0 | Green traffic signal |
|  | Week 2 | | |
| Criteria | <75% correct answers on the diagnostic math test AND one of the | <75% correct answers on the diagnostic math test AND both the following | >75% correct answers on the diagnostic math test |

TABLE 2.1-continued

|  | High | Moderate | Low |
|---|---|---|---|
|  | following <60% of course points for Lab 1, OR using Vista less than −0.5 standard deviations below their peers in the class | less than 80% of course points for Lab 1, AND using Vista less than average compared to their peers in the class. |  |
| Intervention | Red traffic signal Email message 2.1 | Yellow traffic signal Email message 2.2 | Green traffic signal |
|  |  | Week 3 |  |
| Criteria | <60% of course point, AND using Vista less than −0.5 standard deviations below their peers in the class | less than 80% of course points, AND using Vista less than average compared to their peers in the class. | >80% of course points |
| Intervention | Red traffic signal Email Message 3.1 Instructor requests meeting | Yellow traffic signal Email message 3.2 | Green traffic signal |

Table 2.2 includes criteria for each risk category and the associated interventions for weeks 4 through 6. Again, the traffic signals are used throughout the weeks. As the semester advances, the email messages for the high and moderate risk levels take on a harsher tone, warning the student that his academic performance is suffering and advising the student to seek help from a tutoring center on campus or with the instructor or a teaching assistant ("TA"). Additionally, for the high-risk category in week 4, a teaching assistant is prompted by the system to approach the student and discuss options for improving his performance in the class. In week 5, the high and moderate risk categories again include a face-to-face meeting between a TA and the student. Additionally, in week 5, the student is advised by the system to report to the academic advisor regarding his high or moderate risk status. In week 6, if the student continues to be in the high-risk category, the system prompts a faculty member to approach the student about his academic performance.

TABLE 2.2

|  | High | Moderate | Low |
|---|---|---|---|
|  | Week 4 |  |  |
| Criteria | <60% of course point, AND using Vista less than −0.5 standard deviations below their peers in the class | less than 80% of course points, AND using Vista less than average compared to their peers in the class. | >80% of course points |
| Intervention | Red traffic signal Email message 4.1 TAs approach student after lab | Yellow traffic signal Email message 4.2 | Green traffic signal |
|  | Week 5 |  |  |
| Criteria | <60% of course point, AND using Vista less than −0.5 standard deviations below their peers in the class | less than 80% of course points, AND using Vista less than average compared to their peers in the class. | >80% of course points |
| Intervention | Red traffic signal Email message 5.1 TAs approach after lab Report to Academic Advisor | Yellow traffic signal Email message 5.2 TAs approach after lab Report to Academic Advisor | Green traffic signal |
|  | Week 6 |  |  |
| Criteria | <60% of course point, AND using Vista less than −0.5 | less than 80% of course points, AND using Vista less than average compared to | >80% of course points |

TABLE 2.2-continued

|  | High | Moderate | Low |
|---|---|---|---|
|  | standard deviations below their peers in the class | their peers in the class. |  |
| Intervention | Red traffic signal Email message 6.1 Approached by faculty | Yellow traffic signal Email message 6.2 | Green traffic signal |

Table 2.3 includes risk categorization criteria and associated interventions for weeks 7 and 8 of the course. Also visible in Table 2.3 is a rule for the system to follow, which is that for any week after week 2, if a student improves his risk categorization, the system sends him an additional email. The email message is congratulatory and, like other messages sent by the system, is pre-scripted. It should be noted that across the weeks in Tables 2.1 through 2.3, the criteria for each risk category is variable. In preferred embodiments, the system allows a properly authorized person, such as an instructor, to set up the criteria for each risk categorization for each week of class, as well as the interventions for each risk categorization per week. It should also be appreciated that while this example deals with time on a week by week basis, other time increments may be used in other embodiments.

semester, or other time frame. In preferred embodiments, a graphical user interface is included in the system for this purpose. Preferably, the interface is provided by the setup module 128 or dashboard module 126 of the servlet 112, although another module may provide the interface. The interface allows a person with appropriate authorization credentials, which are verified by the authentication module 118, to choose data types to be taken into account. The graphical user interface allows the person to setup criteria similar to that shown Tables 2.1 through 2.3 and/or to define a mathematical equation involving custom weights to place more or less importance on each type of data that the person is interested in including as criteria for risk categories. Additionally, it is possible to define more or less than the three categories of risk shown in Tables 2.1 through 2.3. In preferred embodiments,

TABLE 2.3

|  | High | Moderate | Low |
|---|---|---|---|
|  |  | Week 7 |  |
| Criteria | <70% of course point | <80% but ≧70% of total possible course points OR Moderate Risk (yellow) students getting <80% but ≧ 70% of total possible course points AND had been in high risk (red) group (<70% of total possible course points) before | >80% of course points |
| Intervention | Red traffic signal Email message 7.1 | Yellow traffic signal Email message 7.2 or email message 7.2q | Green traffic signal |
|  |  | Week 8 |  |
| Criteria | <70% of course point | <80% but ≧70% of total possible course points OR Moderate Risk (yellow) students getting <80% but ≧ 70% of total possible course points AND had been in high risk (red) group (<70% of total possible course points) before | >80% of course points |
| Intervention | Red traffic signal Email message 8.1 | Yellow traffic signal Email message 8.2 or email message 8.2q | Green traffic signal |
|  | Ongoing: Any time after week 2 |  |  |
| Criteria | Students who improve from Red to yellow Red to green Yellow to green |  |  |
| Intervention | Email message 7.0 |  |  |

As mentioned previously, preferred embodiments of the system allow an authorized person to set up and customize the criteria for each risk categorization and the associated interventions for different time periods throughout a course, the graphical user interface provides real-time feedback to the person developing the criteria for the risk categorizations. Where the data required for a particular set of risk categorizations is available in the database servers 136, the person can immediately see the classification of a given student change as the person adjusts the criteria defining each risk categorization. This real-time feedback allows the person to easily perceive the effects of changing criteria and facilitates fine-tuning of the risk categorization rules. It should be noted that even when the criteria for the various risk categories are not being defined or adjusted, data is being retrieved and analyzed by the system on a constant basis. Accordingly, as soon as a new piece of information, such as a student's grade on a quiz is collected by the system, the risk categorization associated with the student for that course may change immediately thereafter. In other words, the analysis of data and the association of risk categorizations to students occur in real time.

It is to be understood that all communication between computers and databases as disclosed herein is possible because they are connected together as part of the same computer or networked together via a wired or wireless network. It should also be understood that the databases discussed herein could be embodied in one or more flat files or in relational databases, and that they could be stored in the memory of one computer or distributed across multiple computers.

The above-described processes, including portions thereof, can be performed by software, hardware, and combinations thereof. These processes and portions thereof can be performed by computers, computer-type devices, workstations, processors, micro-processors, other electronic searching tools and memory, and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

This application includes the following papers and incorporates by reference all references cited therein:
1. Campbell, J. P. & Arnold, K. (2008, October). Seminar 01A—Academic Analytics: Using Institutional Data to Improve Student Success. EDUCAUSE Annual Meeting, Orlando, Fla.
2. Campbell, J. P. & Arnold, K. (2008, October). Academic Analytics: Using Institutional Data to Improve Student Success. EDUCAUSE Annual Meeting, Orlando, Fla.
3. Arnold, K., Campbell, J. P., Iten, L, & Kerr, T (2008, October). Multiple Perspectives of Using Analytics to Support Student Success. EDUCAUSE Annual Meeting, Orlando, Fla.

This application also incorporates by reference the following dissertation along with all references cited therein:
Campbell, John Patrick, Utilizing Student Data Within The Course Management System To Determine Undergraduate Student Academic Success: An Exploratory Study, Ph.D. Dissertation, Purdue University, May 2007.

The compact disc incorporated by reference into this specification includes image files which can be viewed after removing the ".txt" extension from their file names.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

We claim:

1. A system for associating a student-specific categorization of risk of poor academic performance to a plurality of students in at least one academic course and informing a person of the risk categorization, the system comprising at least one computer having a processor and memory containing processor-executable instructions for:
collecting and storing data related to each student in computer memory, said data including a plurality of types of data including data selected from a first group including demographic data, personal data, extracurricular activity data, financial data, housing data, employment data, admission data, and registration data, and data selected from a second group including academic data, course management system data, course data, help resources data, technical log data, attendance data, tardiness data, unexcused absences data, workshop attendance data and training data;
permitting a user of the system to select a plurality of data types including data from the first group and from the second group, and to assign custom weights to the selected plurality of data types;
analyzing said data in a manner that takes into account the custom weight assigned to each type of data and results in a categorization of risk that a student will perform poorly academically in the at least one academic course;
associating a risk categorization with each student; and
informing a person of said risk categorization associated with the student through the computer.

2. The system of claim 1, wherein the step of informing a person of said risk categorization associated with the student through the computer includes selecting from computer memory and sending a pre-scripted email, voice message, or text message to the person.

3. The system of claim 1, wherein the at least one computer having a processor and memory containing processor-executable instructions further includes processor-executable instructions for presenting a graphical user interface allowing a person to define and adjust criteria for each of a plurality of categorizations of risk that the student will perform poorly academically.

4. The system of claim 1, wherein the at least one computer having a processor and memory containing processor-executable instructions further includes processor-executable instructions for presenting a graphical user interface allowing a person to specify whether or not the system may send a text message or voice mail to a phone associated with the person.

5. The system of claim 1, wherein the at least one computer having a processor and memory containing processor-executable instructions further includes processor-executable instructions for presenting a graphical user interface allowing a person to see how the categorization of risk associated with the student has changed over at least two time periods.

6. The system of claim 2, wherein the pre-scripted email, voice message, or text message is selected based on the risk categorization associated with the student and an amount of remaining opportunities to improve the academic performance of the student.

7. The system of claim 3, wherein the graphical user interface further allows the person to establish and adjust a weight to be assigned to each type of data in the criteria for each of the plurality of categorizations of risk.

8. The system of claim 3, wherein the graphical user interface further allows the person to define time increments and different criteria for each of the plurality of categorizations of risk for each time increment.

9. The system of claim 3, wherein the graphical user interface further allows the person to define the number of categorizations of risk.

10. The system of claim 3, wherein the graphical user interface presents in real time the categorization of risk to be associated with the student in response to any change in the criteria or data.

11. The system of claim 1, further comprising executable instructions for providing real-time feedback to the user of the system of the effect of the selected data types and custom weights on the risk categorization of a student as the data types are selected and custom weights are assigned by the user.

12. A method implemented by at least one computer having a processor and memory containing processor executable instructions, for associating a categorization of risk of poor academic performance to a plurality of students in at least one academic course and electronically informing a person of the risk categorization, comprising:
    collecting and storing data related to each student in computer memory, said data including a plurality of types of data including data selected from a first group including demographic data, personal data, extracurricular activity data, financial data, housing data, employment data, admission data, and registration data, and data selected from a second group including academic data, course management system data, course data, help resources data, technical log data, attendance data, tardiness data, unexcused absences data, workshop attendance data and training data;
    permitting a user of the system to select a plurality of data types including data from the first group and from the second group, and to assign custom weights to the selected plurality of data types;
    analyzing said data in a manner that takes into account the custom weight assigned to each type of data and results in a categorization of risk that a student will perform poorly academically in the at least one academic course;
    associating a risk categorization with the student; and
    informing a person of said risk associating the risk categorization with the student through the computer.

13. The method of claim 12, further including presenting a graphical user interface allowing a person to define and adjust criteria for each of a plurality of categorizations of risk that the student will perform poorly academically.

14. The method of claim 12, further including presenting a graphical user interface allowing a person to specify whether or not the at least one computer may send a text message or voice mail to a phone associated with the person.

15. The method of claim 12, further including presenting a graphical user interface allowing a person to see how the categorization of risk associated with the student has changed over at least two time periods.

16. The method of claim 12, further including selecting the pre-scripted email, voice message, or text message is based on the risk categorization associated with the student and an amount of remaining opportunities to improve the academic performance of the student.

17. The method of claim 13, wherein the graphical user interface further allows the person to establish and adjust a weight to be assigned to each type of data in the criteria for each of the plurality of categorizations of risk.

18. The method of claim 13, wherein the graphical user interface further allows the person to define time increments and different criteria for each of the plurality of categorizations of risk for each time increment.

19. The method of claim 13, wherein the graphical user interface further allows the person to define the number of categorizations of risk.

20. The method of claim 13, wherein the graphical user interface presents in real time the categorization of risk to be associated with the student in response to any change in the criteria or data.

21. The method of claim 12, wherein the steps of collecting and storing data, and of analyzing said data occur continuously in real time as new data is generated.

22. The method of claim 12, further comprising providing real-time feedback to the user of the system of the effect of the selected data types and custom weights on the risk categorization of a student as the data types are selected and custom weights are assigned by the user.

* * * * *